US012643011B2

(12) United States Patent

Lee

(10) Patent No.: US 12,643,011 B2
(45) Date of Patent: Jun. 2, 2026

(54) METHOD AND SYSTEM FOR PROVIDING INFORMATION ABOUT SEGMENTS COMPRISING GOLF SWING

(71) Applicant: MOAIS, INC., Seoul (KR)

(72) Inventor: Yong Geun Lee, Seoul (KR)

(73) Assignee: MOAIS, INC., Seoul (KR)

( * ) Notice: Subject to any disclaimer, the term of this patent is extended or adjusted under 35 U.S.C. 154(b) by 372 days.

(21) Appl. No.: 18/374,047

(22) Filed: Sep. 28, 2023

(65) Prior Publication Data

US 2025/0058173 A1     Feb. 20, 2025

(30) Foreign Application Priority Data

Aug. 16, 2023     (KR) ........................ 10-2023-0107296

(51) Int. Cl.
| | |
|---|---|
| *A63B 24/00* | (2006.01) |
| *A63B 69/36* | (2006.01) |
| *A63B 71/06* | (2006.01) |
| *G06V 10/74* | (2022.01) |
| *G06V 40/20* | (2022.01) |

(52) U.S. Cl.
CPC .......... *A63B 24/0006* (2013.01); *A63B 69/36* (2013.01); *A63B 71/0622* (2013.01); *G06V 10/761* (2022.01); *G06V 40/23* (2022.01); *A63B 2024/0012* (2013.01); *A63B 2220/806* (2013.01)

(58) Field of Classification Search
CPC . A63B 24/0006; A63B 69/36; A63B 71/0622; A63B 2024/0012; A63B 2220/806; A63B 2024/0009; A63B 2102/32; A63B 2220/807; G06V 10/761; G06V 40/23; G06V 10/34; G06T 2207/30221; G06T 7/20; G09B 9/00; G09B 19/0038
USPC ....... 473/151, 207, 209, 216, 221, 266, 407, 473/409
See application file for complete search history.

(56) References Cited

U.S. PATENT DOCUMENTS

| | | | | |
|---|---|---|---|---|
| 5,111,410 A * | 5/1992 | Nakayama | ........... | A61B 5/1127 348/157 |
| 5,823,878 A * | 10/1998 | Welch | ................ | G09B 19/0038 463/43 |
| 6,514,081 B1 * | 2/2003 | Mengoli | ................ | A63B 69/36 434/428 |
| 7,404,774 B1 * | 7/2008 | Cheng | ................ | A63B 24/0003 473/409 |
| 8,175,326 B2 * | 5/2012 | Siegel | .................... | G06V 40/23 382/209 |
| 9,782,654 B2 * | 10/2017 | Molinari | ............ | A63B 69/3629 |

(Continued)

FOREIGN PATENT DOCUMENTS

| | | |
|---|---|---|
| JP | 2014033941 A | 2/2014 |
| JP | 2015123206 A | 7/2015 |

(Continued)

*Primary Examiner* — Nini F Legesse
(74) *Attorney, Agent, or Firm* — Dinsmore & Shohl LLP; Yongsok Choi, Esq.

(57) ABSTRACT

A method for providing information on segments constituting a golf swing is provided. The method includes the steps of: acquiring two or more images of a golf swing; and generating information on at least one segment constituting the golf swing with reference to a result of comparing the two or more images.

7 Claims, 7 Drawing Sheets

(56)                    References Cited

U.S. PATENT DOCUMENTS

| 2005/0196737 | A1* | 9/2005 | Mann | A63B 24/0003 |
| | | | | 434/247 |
| 2006/0252018 | A1* | 11/2006 | Sooch | A63B 69/3614 |
| | | | | 434/252 |
| 2007/0270214 | A1* | 11/2007 | Bentley | A63B 24/0006 |
| | | | | 463/43 |
| 2009/0220124 | A1* | 9/2009 | Siegel | G06T 7/292 |
| | | | | 382/103 |
| 2010/0303303 | A1* | 12/2010 | Shen | G06V 40/20 |
| | | | | 382/107 |
| 2014/0047457 | A1* | 2/2014 | Nojima | H04N 23/80 |
| | | | | 719/313 |
| 2014/0285718 | A1* | 9/2014 | Murakami | H04N 5/772 |
| | | | | 348/571 |
| 2022/0203200 | A1* | 6/2022 | Watanabe | A63B 69/3623 |

FOREIGN PATENT DOCUMENTS

| JP | 2021124748 | A | 8/2021 |
| KR | 100620873 | B1 | 9/2006 |
| KR | 1020220067741 | A | 5/2022 |
| KR | 1020220091976 | A | 7/2022 |
| KR | 1020230001294 | A | 1/2023 |

* cited by examiner

200

| 210 | Image Acquisition Unit |
| 220 | Segment Information Generation Unit |
| 230 | Segment Information Acquisition Unit |
| 240 | Feedback Information Generation Unit |
| 250 | Information Provision Unit |

Control Unit — 270

Communication Unit — 260

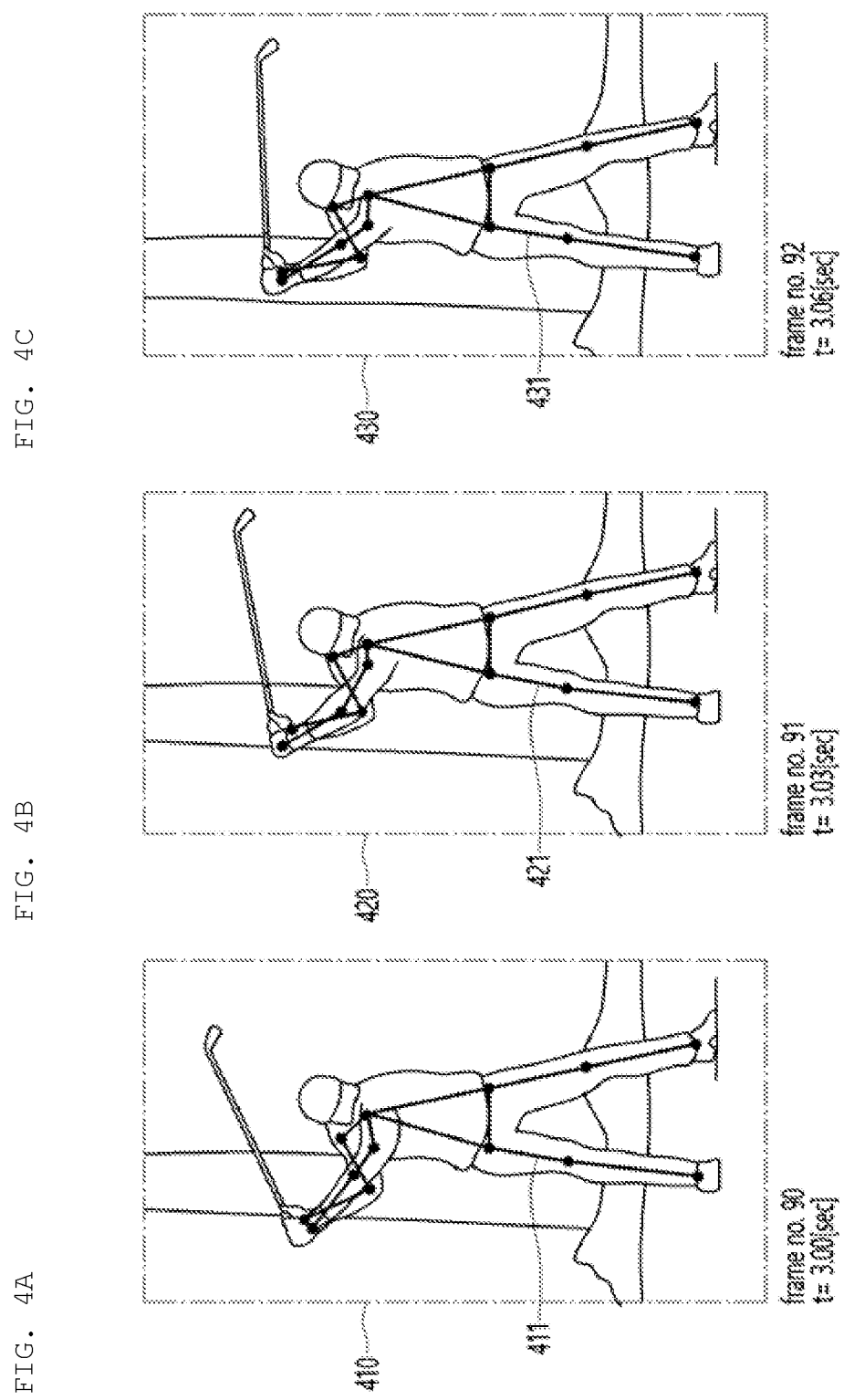

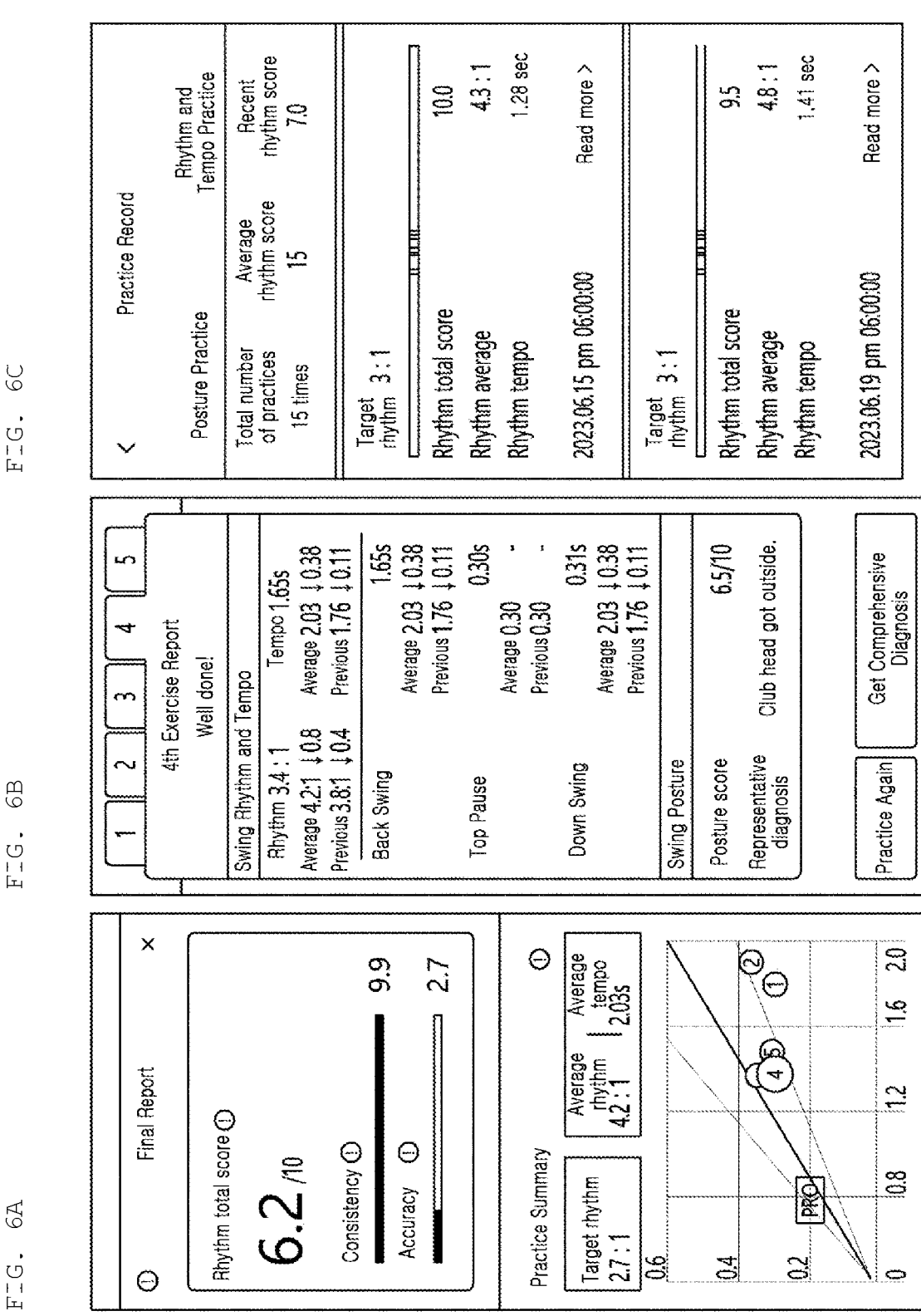

Final Report

Rhythm total score ⓘ

6.2 /10

Consistency ⓘ                                    9.9

Accuracy ⓘ                                        2.7

Practice Summary                                  ⊖

Target rhythm        Average        Average
2.7 : 1              rhythm          tempo
                     4.2 : 1         2.03s 0.6

0.4

0.2                  PRO          ④⑤  ②①

| 1 | 2 | 3 | 4 | 5 |

4th Exercise Report
Well done!

Swing Rhythm and Tempo

Rhythm 3.4 : 1              Tempo 1.65s
Average 4.2:1 ↓0.8    Average 2.03 ↓0.38
Previous 3.8:1 ↓0.4   Previous 1.76 ↓0.11

Back Swing                              1.65s
                    Average 2.03 ↓0.38
                    Previous 1.76 ↓0.11

Top Pause                               0.30s
                    Average 0.30      -
                    Previous 0.30     -

Down Swing                              0.31s
                    Average 2.03 ↓0.38
                    Previous 1.76 ↓0.11

Swing Posture

Posture score                          6.5/10

Representative      Club head got outside.
diagnosis

Practice Again      Get Comprehensive
                    Diagnosis

FIG. 6C

∨                    Practice Record

Rhythm and
                                        Tempo Practice

Posture Practice    Average          Recent
                    rhythm score     rhythm score
Total number        15               7.0
of practices
15 times Target             Rhythm total score          10.0
rhythm  3 : 1
                   Rhythm average               4.3 : 1
                   Rhythm tempo                 1.28 sec 2023.06.15 pm 06:00:00              Read more ⟩

Target             Rhythm total score           9.5
rhythm  3 : 1
                   Rhythm average               4.8 : 1
                   Rhythm tempo                 1.41 sec 2023.06.19 pm 06:00:00              Read more ⟩

METHOD AND SYSTEM FOR PROVIDING INFORMATION ABOUT SEGMENTS COMPRISING GOLF SWING

CROSS-REFERENCE TO RELATED APPLICATION

This application claims priority to Korean Patent Application No. 10-2023-0107296 filed on Aug. 16, 2023, the entire contents of which are herein incorporated by reference.

FIELD OF THE INVENTION

The present invention relates to a method and system for providing information on segments constituting a golf swing.

BACKGROUND

In recent years, the number of people playing golf has been increasing with the increase in leisure time, and various industries related to golf have been growing.

Since golf is a sport in which a user (e.g., a golfer) uses a golf club to make a golf swing and send a golf ball to a target location, analyzing the golf swing and providing adequate feedback according to the golf swing can help improve golf skills.

One example of a conventional method for analyzing a golf swing is to acquire a video of a swing posture of a user who makes a golf swing using a camera, and analyze the acquired video.

However, there are two main problems with this method. First, despite the importance of information on time segments occupied by partial motions constituting a golf swing (hereinafter referred to as "segments constituting a golf swing") (e.g., a length of a back swing segment or a down swing segment) in analyzing the golf swing, a detailed analysis of the segments constituting the golf swing is not performed. Second, adequate feedback on a result of analyzing the segments constituting the golf swing is not provided to the user, which is not very helpful in improving the user's golf skills.

In this connection, the inventor(s) present a technique for generating information on segments constituting a golf swing by analyzing two or more images of the golf swing, so that a detailed analysis of the segments constituting the golf swing may be performed, and for comparing the information on at least one segment constituting the golf swing and reference information, so that adequate feedback on the golf swing may be provided to a user.

SUMMARY OF THE INVENTION

One object of the present invention is to solve all the above-described problems in prior art.

Another object of the invention is to acquire two or more images of a golf swing, and generate information on at least one segment constituting the golf swing with reference to a result of comparing the two or more images.

Yet another object of the invention is to compare two or more images of a golf swing, and determine which of segments constituting the golf swing corresponds toa particular image with reference to a result of the comparison, thereby accurately analyzing the segments constituting the golf swing.

Still another object of the invention is to ensure that segments constituting a golf swing may be precisely separated even when a sensor (e.g., camera) has a low frame rate.

The representative configurations of the invention to achieve the above objects are described below.

According to one aspect of the invention, there is provided a method comprising the steps of: acquiring two or more images of a golf swing; and generating information on at least one segment constituting the golf swing with reference to a result of comparing the two or more images.

According to another aspect of the invention, there is provided a system comprising: an image acquisition unit configured to acquire two or more images of a golf swing; and a segment information generation unit configured to generate information on at least one segment constituting the golf swing with reference to a result of comparing the two or more images.

In addition, there are further provided other methods and systems to implement the invention, as well as non-transitory computer-readable recording media having stored thereon computer programs for executing the methods.

According to the invention, it is possible to acquire two or more images of a golf swing, and generate information on at least one segment constituting the golf swing with reference to a result of comparing the two or more images.

According to the invention, it is possible to compare two or more images of a golf swing, and determine which of segments constituting the golf swing corresponds to a particular image with reference to a result of the comparison, thereby accurately analyzing the segments constituting the golf swing.

According to the invention, it is possible to ensure that segments constituting a golf swing may be precisely separated even when a sensor (e.g., camera) has a low frame rate.

BRIEF DESCRIPTION OF THE DRAWINGS

FIGS. 4A to 4C illustratively show how to compare images of a golf swing according to one embodiment of the invention.

FIGS. 6A to 6C illustratively show a situation in which feedback information is provided according to one embodiment of the invention.

FIGS. 7A and 7B illustratively show a situation in which feedback information is provided according to one embodiment of the invention.

DETAILED DESCRIPTION

Figure 1:
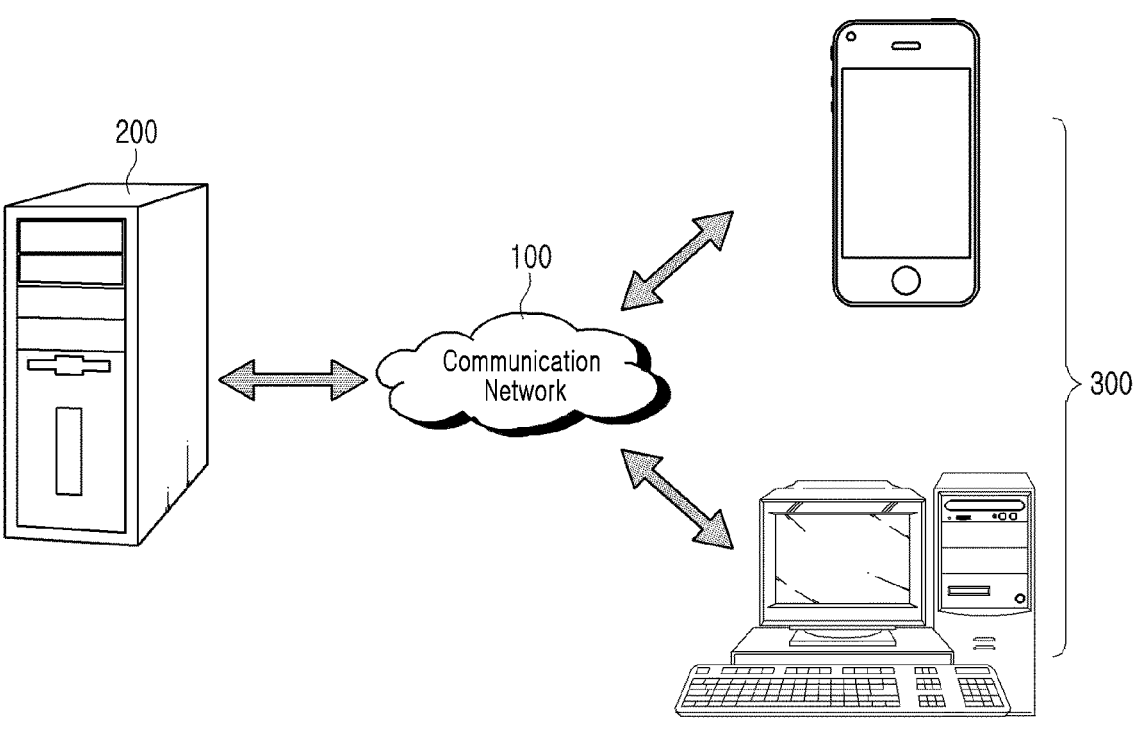
FIG. 1 schematically shows the configuration of an entire system according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system according to one embodiment of the invention.

As shown in FIG. 1, the entire system according to one embodiment of the invention may comprise a communication network 100, an information provision system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long communication, Term Evolution (LTE) 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the information provision system 200 according to one embodiment of the invention may function to acquire two or more images of a golf swing, and generate information on at least one segment constituting the golf swing with reference to a result of comparing the two or more images.

Further, the information provision system 200 according to one embodiment of the invention may function to acquire information on at least one segment constituting a golf swing, and generate feedback information on the golf swing with reference to a result of comparing the information on the at least one segment and predetermined reference information.

The configuration and functions of the information provision system 200 according to the invention will be discussed in more detail below.

Next, the device 300 according to one embodiment of the invention is digital equipment capable of connecting to and then communicating with the information provision system 200, and any type of digital equipment having a memory means and a microprocessor for computing capabilities, such as a smart phone, a tablet, a smart watch, a smart band, smart glasses, a desktop computer, a notebook computer, a workstation, a personal digital assistant (PDAs), a web pad, and a mobile phone, may be adopted as the device 300 according to the invention.

In particular, the device 300 may include an application (not shown) for assisting a user to receive functions according to the invention from the information provision system 200. The application may be downloaded from the information provision system 200 or an external application distribution server (not shown). Meanwhile, the characteristics of the application may be generally similar to those of an image acquisition unit 210, a segment information generation unit 220, a segment information acquisition unit 230, a feedback information generation unit 240, an information provision unit 250, a communication unit 260, and a control unit 270 of the information provision system 200 to be described below. Here, at least a part of the application may be replaced with a hardware device or a firmware device that may perform a substantially equal or equivalent function, as necessary.

Configuration of the Information Provision System

Hereinafter, the internal configuration of the information provision system 200 crucial for implementing the invention and the functions of the respective components thereof will be discussed.

Figure 2:
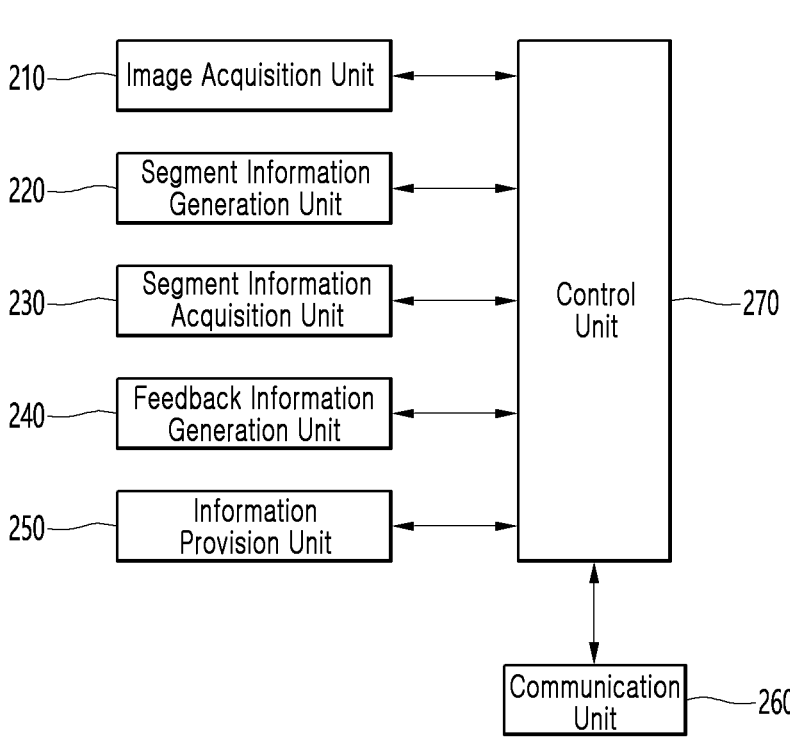
FIG. 2 specifically shows the internal configuration of an information provision system according to one embodiment of the invention.

FIG. 2 specifically shows the internal configuration of the information provision system 200 according to one embodiment of the invention.

As shown in FIG. 2, the information provision system 200 according to one embodiment of the invention may comprise an image acquisition unit 210, a segment information generation unit 220, a segment information acquisition unit 230, a feedback information generation unit 240, an information provision unit 250, a communication unit 260, and a control unit 270. According to one embodiment of the invention, at least some of the image acquisition unit 210, the segment information generation unit 220, the segment information acquisition unit 230, the feedback information generation unit 240, the information provision unit 250, the communication unit 260, and the control 270 may be program modules to communicate with an external system (not shown). The program modules may be included in the information provision system 200 in the form of operating systems, application program modules, or other program modules, while they may be physically stored in a variety of commonly known storage devices. Further, the program modules may also be stored in a remote storage device that may communicate with the information provision system 200. Meanwhile, such program modules may include, but are not limited to, routines, subroutines, programs, objects, components, data structures, and the like for performing specific tasks or executing specific abstract data types as will be described below in accordance with the invention.

The term "golf swing" as used herein may refer to a swing motion for sending a golf ball to a target point. Here, a golf swing may be composed of eight steps of partial motions such as an address, a takeaway, a back swing, a top-of-swing, a down swing, an impact, a follow-through, and a finish. However, the eight steps of partial motions are merely illustrative, and it will be apparent to those skilled in the art that a golf swing motion may be separated in a variety of ways.

Figure 3:
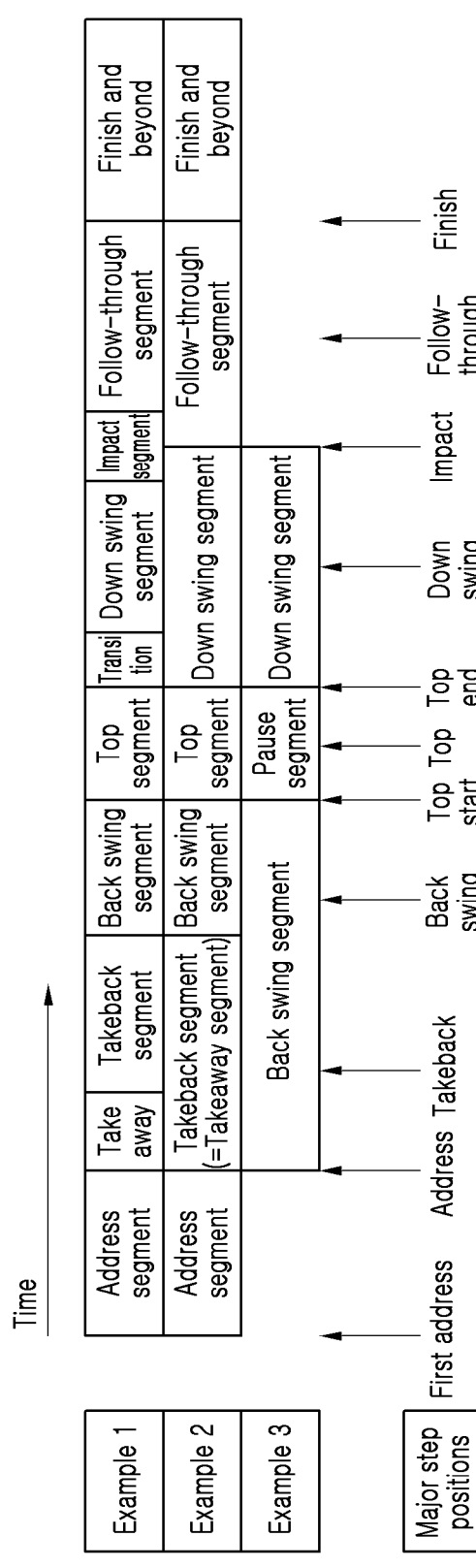
FIG. 3 illustratively shows segments constituting a golf swing according to one embodiment of the invention.

FIG. 3 illustratively shows segments constituting a golf swing according to one embodiment of the invention.

For example, referring to Example 1 shown in FIG. 3, the golf swing according to one embodiment of the invention may be separated into ten steps of segments such as an address, a takeaway, a takeback, a back swing, a top-of-swing, a transition, a down swing, an impact, a follow-through, and a finish. Further, referring to Example 2 shown in FIG. 3, the golf swing according to one embodiment of the invention may be separated into seven steps of segments such as an address, a takeback, a back swing, a top-of-swing, a down swing, a follow-through, and a finish. Furthermore, referring to Example 3 shown in FIG. 3, the golf swing according to one embodiment of the invention may be separated into three steps of segments such as a back swing, a top-of-swing (or a pause segment), and a down swing.

Meanwhile, the above description is illustrative although the information provision system 200 has been described as above, and it will be apparent to those skilled in the art that at least a part of the components or functions of the information provision system 200 may be implemented in the device 300 or a server (not shown) or included in an external system (not shown), as necessary.

First, the image acquisition unit 210 according to one embodiment of the invention may function to acquire two or more images of a golf swing.

Specifically, the two or more images of the golf swing according to one embodiment of the invention may be acquired from a sensor (e.g., an image sensor such as a camera). For example, the image acquisition unit 210 according to one embodiment of the invention may acquire, from the sensor, a plurality of frame images contained in a video of a user's golf swing as the two or more images of the golf swing.

For example, the two or more images according to one embodiment of the invention may include a first image and a second image that are acquired consecutively. As a specific example, when the first image according to one embodiment of the invention is the 90th frame of the video of the user's golf swing, the second image according to one embodiment of the invention may be the 89th or 91st frame of the video of the user's golf swing. However, it should be apparent to those skilled in the art that the two or more images acquired by the image acquisition unit 210 according to one embodiment of the invention are not necessarily consecutively acquired, but may be temporally separated (e.g., not consecutive) (e.g., the first image is the 50th frame image and the second image is the 90th frame image).

Further, the image acquisition unit 210 according to one embodiment of the invention may acquire the two or more images of the golf swing from at least one sensor. For example, the at least one sensor according to one embodiment of the invention may include a variety of sensors such as a ground pressure sensor and an image sensor.

Further, the images that may be acquired by the image acquisition unit 210 according to one embodiment of the invention may include at least one of a two-dimensional image and a three-dimensional image. For example, according to one embodiment of the invention, the image acquisition unit 210 may acquire a two-dimensional image from one image sensor (e.g., a camera), and may also acquire two or more three-dimensional images by generating the three-dimensional images using two or more two-dimensional images acquired from two or more image sensors.

Next, the segment information generation unit 220 according to one embodiment of the invention may function to generate information on at least one segment constituting the golf swing with reference to a result of comparing the two or more images.

Specifically, the segment information generation unit 220 according to one embodiment of the invention may compare the two or more images.

FIGS. 4A to 4C illustratively show how to compare images of a golf swing according to one embodiment of the invention.

For example, referring to FIGS. 4A to 4C, the segment information generation unit 220 according to one embodiment of the invention may compare a first image 410 and a second image 420, and more specifically, may compare first joint information 411 of the first image 410 and second joint information 421 of the second image 420. Here, the joint information (i.e., the first joint information and the second joint information) according to one embodiment of the invention may be extracted from the images (i.e., the first image and the second image) by a joint information estimation model trained using an artificial neural network. Further, the joint information according to one embodiment of the invention may include information on line segments constructed by extracting positions of the user's joints from the images and connecting the joints located at the different extracted positions.

As another example, referring to FIGS. 4A to 4C, the segment information generation unit 220 according to one embodiment of the invention may compare first shaft information of the first image 410 and second shaft information of the second image 420. Specifically, referring to FIGS. 4A to 4C, the segment information generation unit 220 according to one embodiment of the invention may compare first slope information included first shaft information and second slope information included in the second shaft information.

However, the method of comparing the two or more images according to one embodiment of the invention is not necessarily performed in a manner of comparing joint information or shaft information, and may be diversely changed as long as the object of the invention may be achieved. For example, the method of comparing the two or more images according to one embodiment of the invention may also be performed in a manner of comparing pixel values of the two or more images, or comparing specific numerical values derived by filtering the two or more images according to predetermined conditions, respectively.

Referring to FIG. 3, the segments constituting the golf swing according to one embodiment of the invention may be variously separated, but in order to calculate a rhythm of the golf swing (e.g., a ratio between a length of a first segment relating to a back swing and a length of a second segment relating to a down swing), it may be necessary to accurately analyze information on the first segment relating to the back swing and information on the second segment relating to the down swing. Accordingly, the at least one segment constituting the golf swing according to one embodiment of the invention may include the first segment relating to the back swing and the second segment relating to the down swing, and the information on the at least one segment generated by the segment information generation unit 220 according to one embodiment of the invention may include information on the ratio between the first segment and the second segment.

Further, the segment information generation unit 220 according to one embodiment of the invention may generate information on at least one segment constituting the golf swing.

For example, the information on the at least one segment generated by the segment information generation unit 220 according to one embodiment of the invention may include at least one of information on a length of at least one segment constituting the golf swing and information on a ratio between two or more segments constituting the golf swing.

As a specific example, the information on the at least one segment generated by the segment information generation unit 220 according to one embodiment of the invention may include at least one of first segment information on a length of a first segment, second segment information on a length of a second segment, and segment ratio information on a ratio between the first segment and the second segment.

Further, the segment information generation unit 220 according to one embodiment of the invention may generate the information on the at least one segment by determining whether a segment corresponding to the first image is identical to a segment corresponding to the second image with reference to a result of comparing the first image and the second image.

For example, referring to FIGS. 4A to 4C, the segment information generation unit 220 according to one embodiment of the invention may determine a level of similarity between the first joint information 411 extracted from the first image 410 and the second joint information 421 extracted from the second image 420 when the second image 420 corresponds to a segment relating to a top-of-swing (hereinafter referred to as "top segment"), and may determine that the segment corresponding to the first image 410 is identical to the segment corresponding to the second image 420 (i.e., both the first image 410 and the second image 420 correspond to the top segment) when the level of similarity between the first joint information 411 and the second joint information 421 is higher than a predetermined level (e.g., when a level of similarity between a swing posture in the first image 410 and a swing posture in the second image 420 is high). Here, when the level of similarity between the first joint information 411 and the second joint information 421 is lower than the predetermined level (e.g., when the level of similarity between the swing posture in the first image 410 and the swing posture in the second image 420 is low), it may be determined that the segment corresponding to the first image 410 is not identical to the segment corresponding to the second image 420 (i.e., the second image 420 corresponds to the top segment but the first image 410 corresponds to a previous segment, i.e., back swing segment).

Further, at least one of the first image and the second image according to one embodiment of the invention may be a reference image determined according to a predetermined condition for separating the swing segments.

For example, the reference image determined according to a predetermined condition for separating the swing segments according to one embodiment of the invention may refer to an image in which the degree of change in the user's posture during the golf swing is not greater than a predetermined level (e.g., an image corresponding to a time point when the user is determined to pause during the golf swing). Here, the reference image according to one embodiment of the invention may refer to an image corresponding to a time point when the user is determined to momentarily pause at the top segment of the golf swing (e.g., a time point when the degree of change in the posture is not greater than a predetermined level).

Thus, the segment information generation unit 220 according to one embodiment of the invention may generate the information on the at least one segment by specifying a reference image determined according to a predetermined condition, from among two or more images of a golf swing (e.g., a plurality of image frames contained in a video of the swing), and comparing the reference image and another image to determine whether a segment corresponding to the reference image (e.g., a top segment) is identical to a segment corresponding to the other image (e.g., a back swing segment, a top segment, or a down swing segment).

As a specific example, the segment information generation unit 220 according to one embodiment of the invention may generate the information on the at least one segment by acquiring a plurality of image frames of a golf swing, specifying a frame in which a change in the user is not greater than a predetermined level (e.g., a frame in which a movement of a joint is not greater than a predetermined level when comparing joint information extracted from the images, or a change in an angle of a shaft is not greater than a predetermined level), from among consecutive frames of the plurality of image frames, as a reference image, comparing the reference image and another image acquired earlier or later than the reference image, and determining whether a segment corresponding to the reference image is identical to a segment corresponding to the other image.

As another specific example, referring to FIGS. 4A to 4C, when the segment information generation unit 220 according to one embodiment of the invention specifies a third image 430 as a reference image (e.g., an image corresponding to a top segment), the segment information generation unit 220 may compare the third image 430 and the second image 420 to determine whether the second image 420 corresponds to the top segment. Here, according to one embodiment of the invention, when a level of similarity between the second image 420 and the third image 430 is not less than a predetermined level, the second image 420 may be determined to correspond to the top segment. Then, the segment information generation unit 220 according to one embodiment of the invention may compare the second image 420 and the first image 410, and determine whether a segment corresponding to the first image 410 is identical to the segment corresponding to the second image 420. Here, when it is determined that the segment corresponding to the second image 420 is not identical to the segment corresponding to the first image 410, the segment information generation unit 220 according to one embodiment of the invention may generate the information on the at least one segment by determining that the second image 420 and the third image 430 correspond to the same segment (e.g., top segment) and the first image 410 corresponds to a back swing segment.

Thus, according to the invention, it is possible to determine to which of segments of a golf swing two or more images of the golf swing correspond by sequentially analyzing consecutive images (e.g., comparing the first image 410 and the second image 420, comparing the second image 420 and the third image 430, comparing the third image 430 and a fourth image (not shown), and so on).

Meanwhile, it should be apparent to those skilled in the art that the reference image according to one embodiment of the invention is not necessarily an image corresponding to a top segment, but may also be an image corresponding to an address segment or a time of impact. For example, the segment information generation unit 220 according to one embodiment of the invention may extract position information of the golf ball from two or more images, specify an image corresponding to a time point when the position of the golf ball starts to change (e.g., a time of impact), from among the two or more images, as a reference image determined according to a predetermined condition, and compare the two or more images using the reference image.

An image sensor (e.g., a camera) has a finite frame rate (e.g., a frame rate of 30 frames per second), and even if two or more images are acquired consecutively, there may be a time gap between the consecutively acquired images. Here, it is important to accurately calculate a length of a specific segment of a golf swing in order to precisely analyze segments constituting the golf swing, so that it may be necessary to determine a start time point and an end time point of a specific segment of the golf swing.

Thus, in response to determining that the segment corresponding to the first image is not identical to the segment corresponding to the second image, the segment information generation unit 220 according to one embodiment of the invention may determine a time point when the segment corresponding to the first image is separated from the segment corresponding to the second image.

For example, referring to FIGS. 4A to 4C, it may be assumed that the segment information generation unit 220 according to one embodiment of the invention determines that the segment corresponding to the first image 410 is a back swing segment, and the segment corresponding to the second image 420 and the third image 430 is a top segment. Here, according to one embodiment of the invention, with reference to information on a time point corresponding to the first image 410 (e.g., t=3.00 sec) and information on a time point corresponding to the second image 420 (e.g., t=3.03 sec), the segment information generation unit 220 may determine a time point when the two different segments of the golf swing (i.e., the back swing segment and the top segment) are separated as a time point corresponding to a median value of the time point corresponding to the first image 410 and the time point corresponding to the second image 420 (e.g., t=3.15 sec), and may determine a time point corresponding to an end time point of the back swing segment (i.e., a start time point of the top segment) (e.g., t=3.15 sec).

Meanwhile, as described above, according to one embodiment of the invention, the median value of the time point corresponding to the first image and the time point corresponding to the second image may be determined as the time point when the two different segments are separated. However, in order to generate more accurate information on segments constituting the golf swing, it may be necessary to more precisely determine the time point when the segment corresponding to the first image is separated from the segment corresponding to the second image, on the basis of a level of similarity between the first image and the second image.

Thus, the segment information generation unit 220 according to one embodiment of the invention may determine weight information on the second image on the basis of the level of similarity between the first image and the second image, and may determine a length of a time period that is assigned to the segment corresponding to the first image, among a time period corresponding to the second image, with reference to the weight information.

For example, referring to FIGS. 4A to 4C, when the first image 410 corresponds to a back swing segment and the second image 420 corresponds to a top segment, the segment information generation unit 220 according to one embodiment of the invention may calculate a level of similarity between the first image 410 and the second image 420. Here, when the level of similarity between the first image 410 and the second image 420 according to one embodiment of the invention is high, a time point when the segment corresponding to the first image 410 is separated from the segment corresponding to the second image 420 may be determined as a time point closer to the time point corresponding to the first image 410, among the time point corresponding to the first image 410 (t=3.00 sec) and the time point corresponding to the second image 420 (t=3.03 sec).

In other words, according to one embodiment of the invention, when the first image and the second image have a high level of similarity even though the golf swing segments corresponding to the first image and the second image are different, the time point corresponding to the first image may be considered as being close to the start time point of the segment corresponding to the second image, so that the time point when the segment corresponding to the first image is separated from the segment corresponding to the second image may be determined as a time point closer to the time point corresponding to the first image, among the time point corresponding to the first image and the time point when the second image is acquired.

As another example, referring to FIGS. 4A to 4C, when the first image 410 belongs to a segment relating to a back swing and the second image 420 belongs to a segment relating to a top-of-swing, the segment information generation unit 220 according to one embodiment of the invention may calculate a level of similarity between the first image 410 and the second image 420, and determine weight information on the first image 410 on the basis of the level of similarity.

As a specific example, referring to FIGS. 4A to 4C, on the basis of the level of similarity between the first image 410 and the second image 420, the segment information generation unit 220 according to one embodiment of the invention may determine weight information on the first image 410, which is to be applied to the first image 410 in response to the level of similarity (e.g., the weight may be 2 if the level of similarity is high and may be 0.5 if the level of similarity is low).

Here, referring to FIGS. 4A to 4C, according to one embodiment of the invention, the segment information generation unit 220 may determine weight information on the first image 410 (e.g., information indicating that the weight is 2) when the level of similarity between the first image 410 and the second image 420 is high (e.g., when the level of similarity satisfies a predetermined condition), and may determine a length of a time period (e.g., 0.01 sec) that is assigned to the segment corresponding to the second image 420, among a time period corresponding to the first image 410, with reference to the weight information. In other words, since the weight relating to the first image 410 is 2, the time point corresponding to the first image 410 may be reflected twice as much as the time point corresponding to the second image 420, such that a 1:2 division of the time point corresponding to the first image 410 (e.g., t=3.00 sec) and the time point corresponding to the second image 420 (e.g., t=3.03 sec) may be determined as a time point when the two segments are separated (e.g., t=3.01 sec).

In contrast, as another example, referring to FIGS. 4A to 4C, the segment information generation unit 220 according to one embodiment of the invention may determine weight information on the first image 410 (e.g., information indicating that the weight is 0.5) when the level of similarity between the first image 410 and the second image 420 is low (e.g., when the level of similarity does not satisfy the predetermined condition), and may determine a length of a time period (e.g., 0.02 sec) that is assigned to the segment corresponding to the second image 420, among the time period corresponding to the first image 410, with reference to the weight information. In other words, since the weight relating to the first image 410 is 0.5, the time point corresponding to the first image 410 may be reflected 0.5 times as much as the time point corresponding to the second image 420, such that a 1:0.5 (i.e., 2:1) division of the time point corresponding to the first image 410 (e.g., t=3.00 sec) and the time point corresponding to the second image 420 (e.g., t=3.03 sec) may be determined as a time point when the two segments are separated (e.g., t=3.02 sec).

However, it should be apparent to those skilled in the art that the weight information according to one embodiment of the invention does not necessarily relate to a predetermined constant value, but may be determined in real time by an artificial neural network model. Further, the level of similarity according to one embodiment of the invention may be calculated by comparing the level of similarity between the first joint information 411 and the second joint information 421 using a similarity estimation model trained using an artificial neural network. However, the level of similarity according to one embodiment of the invention is not necessarily calculated from the joint information, but may be calculated by comparing other swing posture information (e.g., information on an angle of a shaft or a displacement of a golf club head).

Thus, according to one embodiment of the invention, when the weight is a certain constant value, the first image may be weighted by the constant value so that a time point for segment separation may be determined as a time point closer to (or farther from) the time point corresponding to the first image.

Further, as the weight information is determined according to the invention, it is possible to more accurately determine a time point when two or more segments are separated by increasing a length of a time period that is assigned to the segment corresponding to the first image, among a time period corresponding to the second image, when a level of similarity between the first image and the second image is high, and reducing the length of the time period that is assigned to the segment corresponding to the first image, among the time period corresponding to the second image, when the level of similarity between the first image and the second image is low.

Hereinafter, it will be described in detail with reference to FIGS. 3 to 4C how to generate information on at least one segment constituting a golf swing according to one embodiment of the invention.

First Embodiment

According to one embodiment of the invention, the segment information generation unit 220 may specify at least one image that is determined to be a back swing segment, among two or more images, as a reference image (e.g., an image in which a golf club is determined to be rising over time, among images acquired before a time of impact, may be specified as the reference image).

Next, the segment information generation unit 220 may determine, with reference to a result of comparing the reference image and another image that is consecutively acquired immediately before the reference image, whether the segment corresponding to the reference image is identical to a segment corresponding to the other image acquired before the reference image. When the segments corresponding to the two images are identical to each other, the segment information generation unit 220 may perform a comparison with yet another image acquired earlier than the other image acquired before the reference image, thereby determining whether the segments are identical. That is, as a result of comparing of the first image and the second image, when it is determined from analysis of the second image that the user pauses in the second image, the segment information generation unit 220 may determine that the second image corresponds to an address segment and the first image corresponds to a back swing segment.

Next, in response to determining that the segment corresponding to the first image (e.g., back swing segment) is not identical to the segment corresponding to the second image (e.g., address segment), the segment information generation unit 220 may determine a time point when the two segments are separated (i.e., a time point when the address segment ends and the back swing segment starts). Here, the segment information generation unit 220 may determine weight information on the second image on the basis of a level of similarity between the first image and the second image, and determine a time point when the address segment ends (i.e., a time point when the back swing segment starts) with reference to the weight information.

Second Embodiment

According to one embodiment of the invention, the segment information generation unit 220 may specify at least one image that is determined to be a top segment, among two or more images, as a reference image (e.g., an image in which a golf club head is located not less than a predetermined distance from the ground, and the degree of change in the user's posture is not greater than a predetermined level, among images acquired before a time of impact, may be specified as the reference image).

Next, the segment information generation unit 220 may determine a start time point of the top segment by sequentially comparing the reference image and images acquired earlier than the reference image. In contrast, the segment information generation unit 220 may determine an end time point of the top segment by sequentially comparing the reference image and images acquired later than the reference image.

Third Embodiment

According to one embodiment of the invention, the segment information generation unit 220 may specify at least one image that is determined to be a down swing segment, among two or more images, as a reference image (e.g., an image in which a golf club head approaches the ground, among images acquired before a time of impact, may be specified as the reference image).

Next, the segment information generation unit 220 may determine an end time point of the top segment by sequentially comparing the reference image and images acquired earlier than the reference image. In contrast, the segment information generation unit 220 may determine an end time point of the down swing segment by sequentially comparing the reference image and images acquired later than the reference image. Here, instead of determining the end time point of the down swing segment on the basis of a level of similarity between the two or more images, the segment information generation unit 220 may determine the end time point of the down swing segment by acquiring information on a position of a golf ball and specifying a time of impact with reference to a change in the position of the ball.

Fourth Embodiment

According to the various embodiments as described above, the segment information generation unit 220 according to one embodiment of the invention may determine at least one of a start time point of a back swing segment, an end time point of the back swing segment (i.e., a start time point of a top segment), an end time point of the top segment (i.e., a start time point of a down swing segment), and an end time point of the down swing segment (i.e., a time of impact), and may generate information on at least one of a length of the back swing segment (i.e., a length from the start time point of the back swing segment to the end time point of the back swing segment), a length of the top segment (i.e., a length from the start time point of the top segment to the end time point of the top segment), and a length of the down swing segment (i.e., a length from the start time point of the down swing segment to the end time point of the down swing segment).

Further, according to one embodiment of the invention, the segment information generation unit 220 may generate information on a ratio between the length of the back swing segment and the length of the down swing segment as the information on the at least one segment.

Hereinafter, a method for providing feedback on the golf swing will be described in detail.

Next, the segment information acquisition unit 230 according to one embodiment of the invention may function to acquire the information on the at least one segment constituting the golf swing.

Specifically, the at least one segment constituting the golf swing may include a first segment relating to a back swing and a second segment relating to a down swing. Here, the information on the at least one segment may include at least one of first segment information on a length of the first segment, second segment information on a length of the second segment, and segment ratio information on a ratio between the first segment and the second segment.

Further, the segment information acquisition unit 230 according to one embodiment of the invention may acquire the information on the at least one segment constituting the golf swing from the segment information generation unit 220 described above. However, the segment information acquisition unit 230 according to one embodiment of the invention may also acquire the information on the at least one segment constituting the golf swing from a system (not shown) inside or outside the information provision system 200.

For example, when the information provision system 200 according to one embodiment of the invention interworks with a virtual golf simulator system (not shown), the segment information acquisition unit 230 according to one embodiment of the invention may acquire at least one of the first segment information on the length of the first segment, the second segment information on the length of the second segment, and the segment ratio information on the ratio between the first segment and the second segment from the virtual golf simulator system.

As another example, the segment information generation unit 220 according to one embodiment of the invention may acquire the information on the at least one segment constituting the golf swing from the device 300. Here, the device 300 may include, but is not limited to, a mobile device having an image sensor.

Next, the feedback information generation unit 240 according to one embodiment of the invention may function to generate feedback information on the golf swing with reference to a result of comparing the information on the at least one segment and predetermined reference information.

Specifically, the predetermined reference information according to one embodiment of the invention may include at least one of first reference segment information corresponding to the first segment information, second reference segment information corresponding to the second segment information, and reference segment ratio information corresponding to the segment ratio information.

For example, the predetermined reference information according to one embodiment of the invention may include at least one of first reference segment information (e.g., information on a length of a back swing segment of a professional golfer), second reference segment information (e.g., information on a length of a down swing segment of the professional golfer), and reference segment ratio information (e.g., information on a ratio between the lengths of the back swing segment and the down swing segment of the professional golfer) corresponding to a desirable golf swing posture.

As a specific example, the predetermined reference information according to one embodiment of the invention may include at least one of the first reference segment information (e.g., information indicating that the length of the back swing segment is preferably 1.2 seconds), the second reference segment information (e.g., information indicating that the length of the down swing segment is preferably 0.4 seconds), and the reference segment ratio information (e.g., information indicating that the ratio between the length of the back swing segment and the length of the down swing segment is preferably 3:1).

As another example, the predetermined reference information according to one embodiment of the invention may include at least one piece of criterion reference information.

As a specific example, when the first reference segment information according to one embodiment of the invention includes information indicating that the length of the first segment is preferably 0.9 seconds, the criterion reference information included first reference segment information according to one embodiment of the invention may include at least one of information indicating that the swing is desirable if the length of the first segment is not less than 0.8 seconds but less than 1 second, information indicating that the swing is undesirable since the length of the first segment is slightly short if the length of the first segment is not less than 0.6 seconds but less than 0.8 seconds, information indicating that the swing is undesirable since the length of the first segment is slightly long if the length of the first segment is not less than 1 second but less than 1.2 seconds, information indicating that the swing is undesirable since the length of the first segment is very short if the length of the first segment is less than 0.6 seconds, and information indicating that the swing is undesirable since the length of the first segment is very long if the length of the first segment is not less than 1.2 seconds.

Thus, as the reference information according to the invention includes the criterion reference information, at least one of the lengths and ratios of the segments may correspond to subdivided criterion reference information (e.g., the reference information may include two or more pieces of criterion reference information), and as the subdivided criterion reference information and the information on the at least one segment are compared, a variety of feedback information may be generated.

Further, the feedback information generation unit 240 according to one embodiment of the invention may compare the information on the at least one segment and the reference information.

For example, when the segment information acquisition unit 230 according to one embodiment of the invention acquires segment ratio information (e.g., information indicating that a ratio between the lengths of the first and second segments is 4.8:1) from the user's golf swing, the feedback information generation unit 240 may compare the segment ratio information and predetermined reference information (e.g., information indicating that a ratio between the lengths of the first and second segments of a professional golfer is 4:1). Here, the feedback information generation unit 240 according to one embodiment of the invention may induce the user's segment ratio information to be closer to the reference segment ratio information by generating information proposing to make the back swing slightly faster (i.e., to shorten the length of the back swing segment) as the feedback information.

Furthermore, the feedback information generation unit 240 according to one embodiment of the invention may compare the information on the at least one segment and at least one piece of criterion reference information included in the reference information.

For example, the criterion reference information according to one embodiment of the invention may include information indicating that the swing is desirable if the length of the second segment is not less than 0.25 seconds but less than 0.35 seconds, information indicating that the swing is undesirable since the length of the second segment is slightly short if the length of the second segment is not less than 0.2 seconds but less than 0.25 seconds, information indicating that the swing is undesirable since the length of the second segment is slightly long if the length of the second segment is not less than 0.35 seconds but less than 0.4 seconds, information indicating that the swing is undesirable since the length of the second segment is very short if the length of the second segment is less than 0.2 seconds, and information indicating that the swing is undesirable since the length of the second segment is very long if the length of the second segment is not less than 0.4 seconds. Here, when the information on the at least one segment according to one embodiment of the invention indicates that the length of the second segment is 0.3 seconds, the feedback information generation unit 240 according to one embodiment of the invention may compare the information on the at least one segment and the reference information, and generate information indicating that the user's down swing is desirable as the feedback information. Here, when the information on the at least one segment according to one embodiment of the invention indicates that the length of the second segment is 0.6 seconds, the feedback information generation unit 240 according to one embodiment of the invention may generate information indicating that the user's down swing is very long and thus undesirable as the feedback information.

In other words, the feedback information generation unit 240 according to one embodiment of the invention may compare the information on the at least one segment and criterion reference information including at least one piece of segment information, determine the segment information to which a length of a particular segment constituting the user's golf swing corresponds, and generate predetermined feedback information corresponding to the segment information.

Meanwhile, it should be appreciated that the at least one segment compared by the feedback information generation unit 240 according to one embodiment of the invention may include a top segment in addition to the first segment and the second segment. For example, the feedback information generation unit 240 according to one embodiment of the invention may compare the criterion reference information and information on the top segment, determine whether the length of the top segment in the user's golf swing is appropriate when compared to the criterion reference information, and generate feedback information on the top segment.

Further, according to one embodiment of the invention, the information on the at least one segment may include first segment information on the length of the first segment and second segment information on the length of the second segment, and the feedback information generation unit 240 may determine a segment to be proposed for correction from among the first segment and the second segment, with reference to a first comparison result corresponding to the first segment information and a second comparison result corresponding to the second segment information. Here, the feedback information generated by the feedback information generation unit 240 may include information on the segment to be proposed for correction.

For example, with reference to a first comparison result obtained by comparing first segment information (e.g., information indicating that the length of the back swing is 1.5 seconds) and first reference segment information (e.g., information indicating that the length of the back swing is ideally not less than 0.8 seconds and not greater than 1.0 second), and a second comparison result obtained by comparing second segment information (e.g., information indicating that the length of the down swing is 0.3 seconds) and second reference segment information (e.g., information indicating that the length of the down swing is ideally not less than 0.25 seconds but less than 0.35 seconds), the feedback information generation unit 240 according to one embodiment of the invention may determine the first segment as the segment to be proposed for correction, from among the first segment and the second segment, because the length of the first segment should be shorter but the length of the second segment is ideal. Here, the feedback information generation unit 240 according to one embodiment of the invention may generate feedback information indicating that the length of the first segment should be corrected to be shorter.

As another example, with reference to a first comparison result obtained by comparing first segment information (e.g., information indicating that the length of the back swing is 1.5 seconds) and first reference segment information (e.g., information indicating that the length of the back swing is ideally not less than 0.8 seconds and not greater than 1.0 seconds), and a second comparison result obtained by comparing second segment information (e.g., information indicating that the length of the down swing is 0.7 seconds) and second reference segment information (e.g., information indicating that the length of the down swing is ideally not less than 0.25 seconds but less than 0.35 seconds), the feedback information generation unit 240 according to one embodiment of the invention may determine the first segment as the segment to be proposed for correction, from among the first segment and the second segment. In other words, the feedback information generation unit 240 according to one embodiment of the invention may determine the first segment as the segment to be proposed for correction because it is desirable to correct the back swing first and then the down swing, when both the length of the back swing and the length of the down swing are long compared to the reference information.

According to the invention, when both the length of the first segment and the length of the second segment differ from the lengths corresponding to the reference information, the user may easily correct his/her posture using the feedback information by specifying which of the first and second segments requires correction first.

Meanwhile, the user may personally determine the reference information according to one embodiment of the invention. For example, the user according to one embodiment of the invention may determine at least one of first reference segment information, second reference segment information, and reference segment ratio information as specific information (e.g., information on a length or ratio of a segment to be targeted by the user). As a specific example, the user according to one embodiment of the invention may provide specific reference segment ratio information (e.g., information indicating that a ratio between a length of a first segment and a length of a second segment is 4:1) to the information provision system 200, and the feedback information generation unit 240 may generate the feedback information by comparing the reference segment ratio information and segment ratio information.

Figures 5A, 5B, 5C:
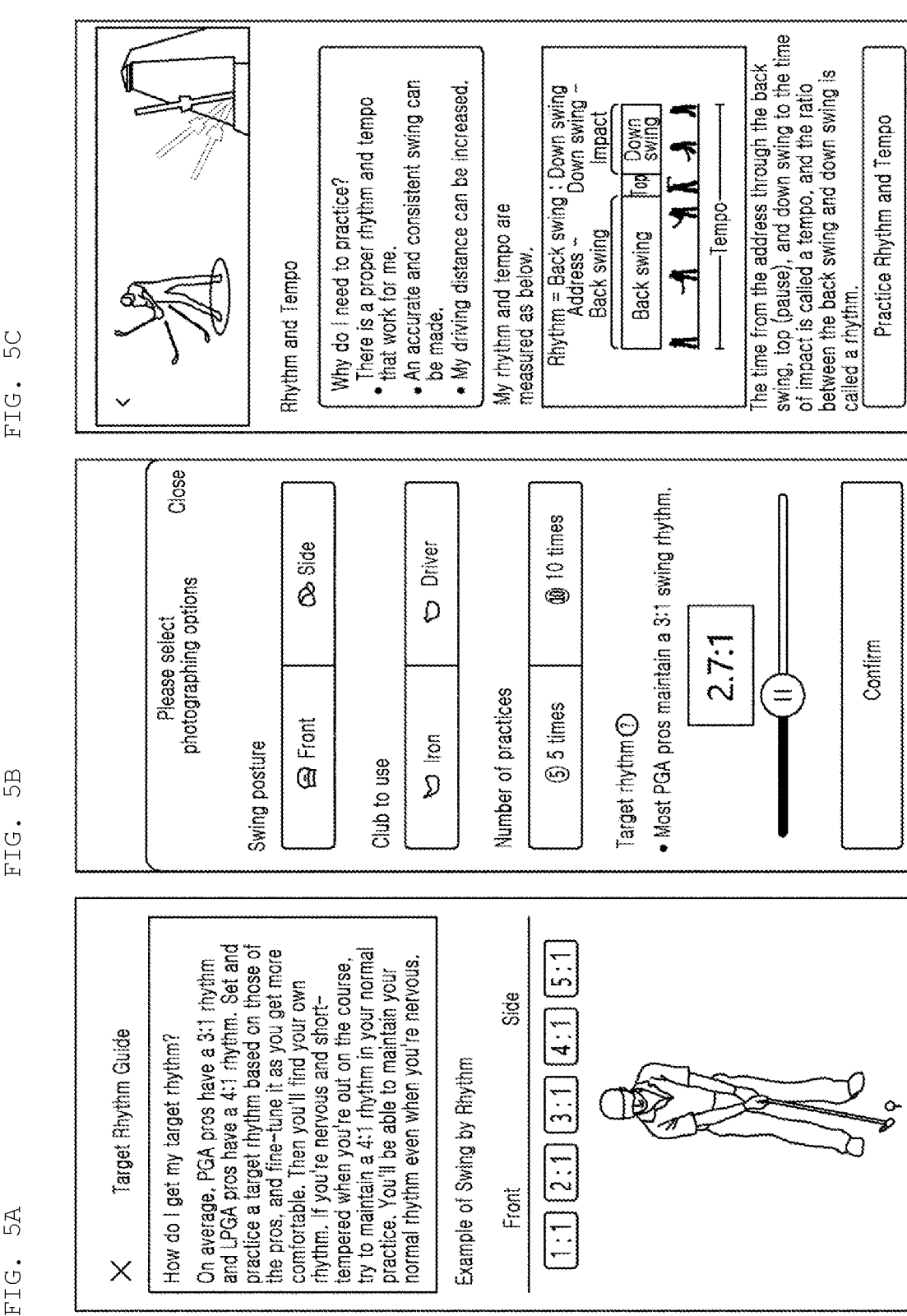
FIGS. 5A to 5C illustratively show user interfaces provided via a display according to one embodiment of the invention.

FIGS. 5A to 5C illustratively show user interfaces provided via a display according to one embodiment of the invention.

Referring to FIG. 5B, the segment information acquisition unit 230 according to one embodiment of the invention may acquire at least one of information on a direction in which the user's swing posture is photographed (e.g., a direction from the user's front or side), information on a type of club to be used by the user (e.g., an iron or a driver), and segment ratio information targeted by the user (e.g., reference segment ratio information), but it should be apparent to those skilled in the art that the above information may be acquired by the image acquisition unit 210 or other components in the information provision system 200. Here, the acquired segment ratio information targeted by the user is predetermined reference segment ratio information, and the feedback information generation unit 240 may generate feedback information by comparing the predetermined reference segment ratio information and the user's segment ratio information.

Meanwhile, the information provision system 200 according to one embodiment of the invention may further comprise an information provision unit 250. The information provision unit 250 according to one embodiment of the invention may function to provide at least one of the predetermined reference information, the information on the at least one segment, and the feedback information via a display.

Specifically, the information provision unit 250 according to one embodiment of the invention may visually provide at least one of the predetermined reference information, the information on the at least one segment, and the feedback information via a display of the device 300 or an external system (not shown). Here, the information provision unit 250 according to one embodiment of the invention may be associated with a user interface (UI)/user experience (UX).

For example, referring to FIG. 5A, the information provision unit 250 according to one embodiment of the invention may illustratively provide a swing video corresponding to particular segment ratio information (e.g., information on a rhythm of a golf swing).

As another example, referring to FIG. 5C, the information provision unit 250 according to one embodiment of the invention may provide information on how a length of a particular segment (e.g., a back swing tempo or a down swing tempo) and a ratio between two segments (e.g., a rhythm of a golf swing) are calculated.

FIGS. 6A to 6C illustratively show a situation in which feedback information is provided according to one embodiment of the invention.

Referring to FIG. 6A, the information provision unit 250 according to one embodiment of the invention may provide information on a length of at least one segment (e.g., information indicating that when a user makes a golf swing, a length of a back swing segment is 1.65 seconds, a length of a top segment is 0.03 seconds, a length of a down swing segment is 0.28 seconds, and a length from start of an address segment 5 to a time of impact is 1.95 seconds) and segment ratio information (e.g., information indicating that a ratio between the length of the back swing segment and the length of the down swing segment is 5.8:1) via a display.

Referring to FIG. 6B, according to one embodiment of the invention, when the feedback information generated by the feedback information generation unit 240 includes information indicating that the length of the first segment (i.e., the length of the back swing segment) in the user's golf swing is determined to be somewhat long compared to first reference segment information, and the length of the back swing should be shorter (i.e., the back swing should be made faster), the information provision unit 250 may provide information indicating that the back swing should be made faster via the display. When the length of the first segment in the user's golf swing is determined to be excessively long compared to the first reference segment information, the feedback information generated by the feedback information generation unit 240 may include information indicating that the length of the back swing should be very short (i.e., the back swing should be made very fast), and the information provision unit 250 may provide information indicating that the back swing should be made very fast via the display.

Thus, according to the invention, the feedback provided to the user may be varied by comparing the information on the at least one segment and at least one piece of criterion reference information included in the reference information.

The information provision unit 250 according to one embodiment of the invention may cumulatively provide the information on the at least one segment in response to the golf swing being made more than once.

For example, referring to FIG. 6A, in response to the user making two or more golf swings, the information provision unit 250 according to one embodiment of the invention may compare a length of a particular segment of a golf swing and a length of the segment of a previous golf swing, and provide information on an increase or decrease in the length of the segment compared to the previous swing. For example, referring to FIG. 6A, when the user has made two or more golf swings, the information provision unit 250 may provide, via the display, information indicating that the length of the back swing segment is shorter compared to the previous swing, the length of the top segment is longer compared to the previous swing, and the length of the down swing segment is shorter compared to the previous swing.

As another example, referring to FIG. 6A, the information provision unit 250 according to one embodiment of the invention may display predetermined reference information (i.e., information represented by the solid line in the graph of FIG. 6A) and the information on the at least one segment (i.e., information represented by the dashed line in the graph of FIG. 6A).

Figures 7A, 7B:
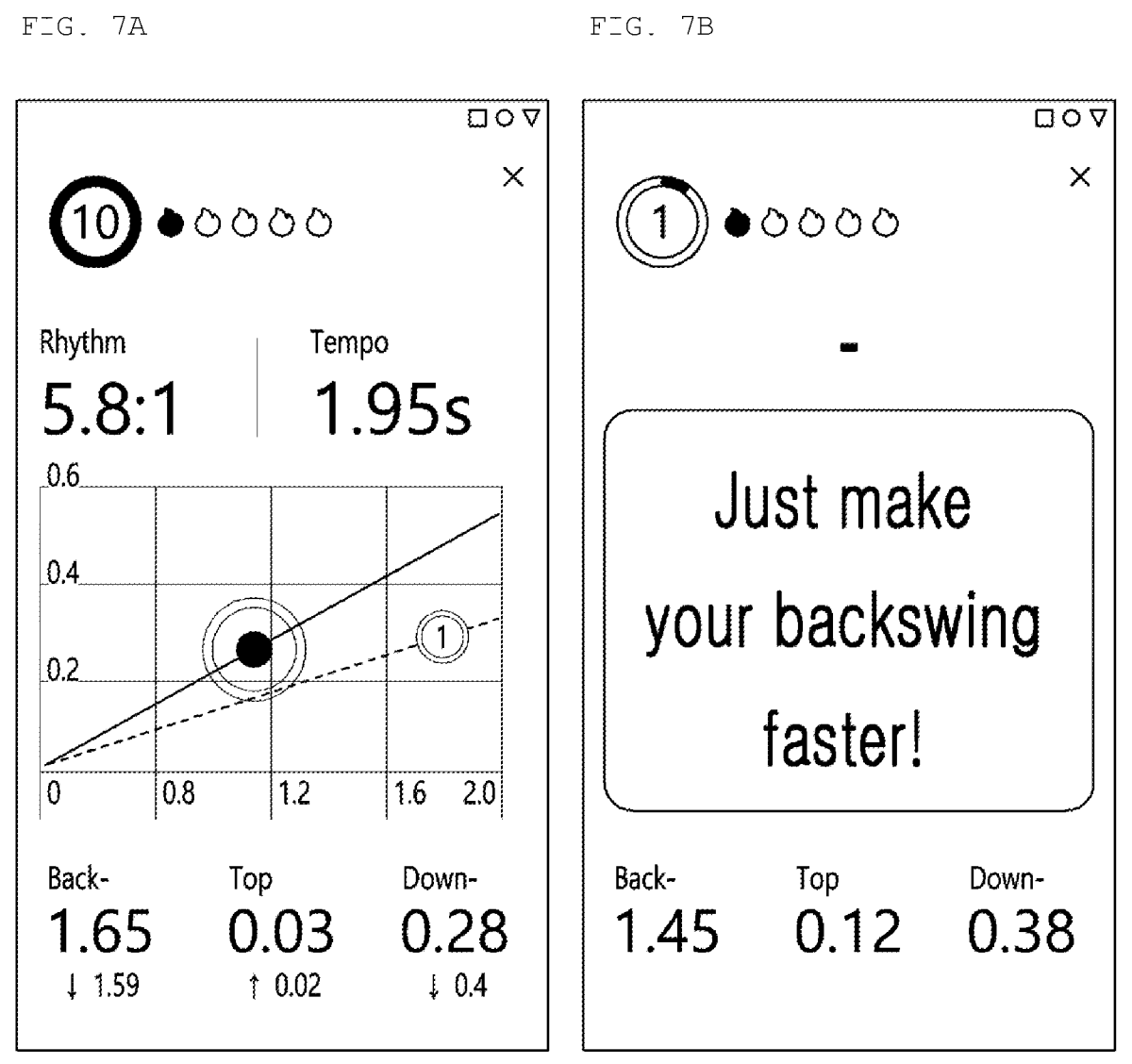

FIGS. 7A and 7B illustratively show a situation in which feedback information is provided according to one embodiment of the invention.

Referring to FIG. 7A, as another example, in response to a user making two or more (e.g., five) golf swings, the information provision unit 250 according to one embodiment of the invention may cumulatively provide results of the golf swings on a screen. Here, the user according to one embodiment of the invention may easily view the results of his/her golf swings, and may be assisted in improving his/her skills.

As another example, the information provision unit 250 according to one embodiment of the invention may provide statistical information corresponding to at least one of the predetermined reference information, the information on the at least one segment, and the feedback information.

Referring to FIGS. 7B and 7C, in response to the user making two or more golf swings, the information provision unit 250 according to one embodiment of the invention may provide, as the statistical information, information on an average of the lengths of the back swing segments, information on an average of the lengths of the down swing segments, and average segment ratio information corresponding to the segment ratio information.

As another example, the information provision unit 250 according to one embodiment of the invention may provide, via a display, at least one of a coordinate system element corresponding to the first segment information and the second segment information, and a slope element corresponding to the segment ratio information.

Referring to FIG. 7A, the information provision unit 250 according to one embodiment of the invention may visually provide a result of a golf swing in a two-dimensional coordinate system comprising an axis (e.g., a horizontal axis) corresponding to the first segment (i.e., back swing segment) and an axis (e.g., a vertical axis) corresponding to the second segment. Here, according to one embodiment of the invention, the segment ratio information may be represented as a slope element with respect to the two axes, so that the information provision unit 250 may provide the slope element corresponding to the segment ratio information via the display.

Thus, according to the invention, the user may easily understand information on the length of the first segment, the length of the second segment, and the segment ratio in his/her swing via the display, so that the user may be assisted in improving his/her golf skills.

Further, referring to FIGS. 7A and 7B, in response to the user making two or more golf swings, the feedback information generation unit 240 according to one embodiment of the invention may further generate at least one of information on consistency of the golf swings and information on accuracy calculated on the basis of levels of similarity between the golf swings and the reference information. Here, the levels of similarity between the golf swings and the reference information may be calculated on the basis of, for example, a linear regression analysis model or a similarity model using an artificial neural network.

Hereinafter, it will be described in detail with reference to FIGS. 5A to 7B how to provide feedback on a golf swing according to one embodiment of the invention.

Fifth Embodiment

Referring to FIG. 5B, according to one embodiment of the invention, information on at least one of a swing posture, a club to use, a number of practices, and a target rhythm may be acquired.

Next, the feedback information generation unit 240 may predetermine reference information with reference to the information on at least one of the club to use (e.g., an iron or a driver) and the target rhythm.

Next, the segment information acquisition unit 230 may acquire information on at least one segment constituting a golf swing.

Then, the feedback information generation unit 240 may generate feedback information on the golf swing with reference to a result of comparing the information on the at least one segment and the predetermined reference information.

Thus, according to the invention, the reference information may be predetermined according to a particular type of club selected by the user, and the user may be provided with feedback information customized for the particular club.

Next, the communication unit 260 according to one embodiment of the invention may function to enable data transmission/reception from/to the image acquisition unit 210, the segment information generation unit 220, the segment information acquisition unit 230, the feedback information generation unit 240, and the information provision unit 250.

Lastly, the control unit 270 according to one embodiment of the invention may function to control data flow among the image acquisition unit 210, the segment information generation unit 220, the segment information acquisition unit 230, the feedback information generation unit 240, the information provision unit 250, and the communication unit 260. That is, the control unit 270 according to one embodiment of the invention may control data flow into/out of the information provision system 200 or data flow among the respective components of the information provision system 200, such that the image acquisition unit 210, the segment information generation unit 220, the segment information acquisition unit 230, the feedback information generation unit 240, the information provision unit 250, and the communication unit 260 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for providing information on segments constituting a golf swing, the system comprising one or more processors and the method comprising the steps of:

by the one or more processors, acquiring a first image and a second image of a golf swing consecutively; and by the one or more processors, generating information on two or more time segments relating to two or more partial motions constituting the golf swing by determining whether a time segment corresponding to the first image is identical to a time segment corresponding to the second image with reference to a level of similarity between first joint information of the first image and second joint information of the second image, wherein in the generating step, in response to determining that the time segment corresponding to the first image is not identical to the time segment corresponding to the second image, a time point when the time segment corresponding to the first image is separated from the time segment corresponding to the second image is determined between a first time point when the first image is acquired and a second time point when the second image is acquired, and wherein in the generating step, the time point when the time segment corresponding to the first image is separated from the time segment corresponding to the second image is determined to be closer to the first time point than to the second time point as a level of similarity between the first image and the second image is higher.

2. The method of claim 1, wherein the two or more time segments include a first time segment relating to a first partial motion and a second time segment relating to second partial motion, and wherein the information on the two or more time segments includes information on a ratio between lengths of the first time segment and the second time segment.

3. A non-transitory computer-readable recording medium having stored thereon a computer program for executing the method of claim 1.

4. The method of claim 1, further comprising:

by the one or more processors, extracting positions of a first set of joints of a user from the first image and connecting the first set of joints to construct the first joint information; and by the one or more processors, extracting positions of a second set of joints of the user from the second image and connecting the second set of joints to construct the second joint information.

5. A system providing information on segments constituting a golf swing, the system comprising one or more processors configured to:

acquire a first image and a second image of a golf swing consecutively; and generate information on two or more time segments relating to two or more partial motions constituting the golf swing by determining whether a time segment corresponding to the first image is identical to a time segment corresponding to the second image with reference to a level of similarity between first joint information of the first image and second joint information of the second image, wherein the one or more processors are configured to, in response to determining that the time segment corresponding to the first image is not identical to the time segment corresponding to the second image, determine a time point when the time segment corresponding to the first image is separated from the time segment corresponding to the second image between a first time point when the first image is acquired and a second time point when the second image is acquired, and wherein the one or more processors are configured to determine the time point when the time segment corresponding to the first image is separated from the time segment corresponding to the second image to be closer to the first time point than to the second time point as a level of similarity between the first image and the second image is higher.

6. The system of claim 5, wherein the two or more time segments include a first time segment relating to a first partial motion and a second time segment relating to second partial motion, and wherein the information on the two or more time segments includes information on a ratio between lengths of the first time segment and the second time segment.

7. The system of claim 5, wherein the one or more processors are further configured to:

extract positions of a first set of joints of a user from the first image and connect the first set of joints to construct the first joint information; and extract positions of a second set of joints of the user from the second image and connect the second set of joints to construct the second joint information.

* * * * *